United States Patent Office 3,646,213
Patented Feb. 29, 1972

3,646,213
COMPOSITIONS AND METHODS FOR TREATING DEPRESSION WITH COMBINATIONS OF L-3,4-DIHYDROXYPHENYLALANINE AND A HYDRAZINE
Giuseppe Bartholini, Basel, Switzerland, assignor to Hoffmann-La Roche Inc., Nutley, N.J.
No Drawing. Continuation of application Ser. No. 753,074, Aug. 16, 1968, now Patent No. 3,557,292. This application Aug. 12, 1970, Ser. No. 63,332
Int. Cl. A61k 27/00
U.S. Cl. 424—319          4 Claims

ABSTRACT OF THE DISCLOSURE

Pharmaceutical compositions are described which contain, as the active ingredients (1) L-3,4-dihydroxyphenylalanine and (2) an N'-substituted-$N^2$-(2,3,4-trihydroxybenzyl)-hydrazine selected from the group consisting of N' - dl - seryl - $N^2$ - (2,3,4 - trihydroxybenzyl)-hydrazine, N' - l - seryl - $N^2$ - (2,3,4-trihydroxybenzyl) - hydrazine, N' - glycyl - $N^2$ - (2,3,4-trihydroxybenzyl)-hydrazine and N' - tyrosyl - $N^2$-(2,3,4-trihydroxybenzyl)-hydrazine.

The use of the described compositions, as well as the use of the individual components thereof separately but as part of the combined therapy, in the treatment of depression and to potentiate the activity of antidepressants, such as, imipramine, and other psychoactive drugs of the tricyclic type is disclosed.

RELATED PATENT APPLICATIONS

This application is a continuing application of my copending application Ser. No. 753,074, filed Aug. 16, 1968 now U.S. Patent No. 3,557,292.

BRIEF SUMMARY OF THE INVENTION

The present invention provides a method for treating depression and for potentiating the activity of antidepressants, such as, imipramine, and other psychoactive drugs of the tricyclic type.

In a more particular embodiment, the invention provides compositions which are useful for the aforesaid purposes.

The invention is carried out by administering L-3,4-dihydroxyphenylalanine, hereinafter referred to as L-DOPA, in combination with an N'-substituted-$N^2$-(2,3,4-trihydroxybenzyl)-hydrazine selected from the group consisting of N'-dl-seryl-$N^2$-(2,3,4-trihydroxybenzyl)-hydrazine, N' - l - seryl - $N^2$ - (2,3,4 - trihydroxybenzyl)-hydrazine, N' - glycyl - $N^2$ - (2,3,4 - trihydroxybenzyl)-hydrazine and N' - tyrosyl - (2,3,4-trihydroxybenzyl)-hydrazine.

DETAILED DESCRIPTION

It has been found that in rats, small doses (50 mg./kg.) of $N^1$ - dl - seryl - $N^2$ - (2,3,4-trihydroxybenzyl)-hydrazine hydrochloride, an inhibitor of the decarboxylase of aromatic aminoacids (DC), enhances, at least for 4 hours, the increase of L-3,4-dihydroxyphenylalanine (L–DOPA) in blood and brain induced by i.p. or oral administration of this amino acid. Simultaneously, the rise of catecholamines (CA) and their metabolites, the phenolcarboxylic acids (PCA) is diminished in the blood and other peripheral tissues (heart, kidney, spleen), but markedly enhanced in the brain. As a consequence of the reduction of the CA in the periphery, the pheripheral adrenergic stimulation is also reduced. On the other hand, the CA stores are tremendously increased in the extrapyramidal brain centers.

These effects are thought to be due to a relatively selective inhibition of DC by $N^1$ - dl - seryl-$N^2$-(2,3,4-trihydroxybenzyl)-hydrazine hydrochloride in extracerebral organs. As a consequence of the increased DOPA concentration in the blood, more of the amino acid penetrates into the brain where decarboxylation to CA occurs, sinced the cerebral DC is practically not inhibited. This selective action of the drug is due to a poor penetration of $N^1$-dl-seryl - $N^2$ - (2,3,4 - trihydroxybenzyl)-hydrazine hydrochloride into the brain. Thus, the DC activity in the brain of animals injected with $N^1$ - dl - seryl - $N^2$-(2,3,4-trihydroxybenzyl)-hydrazine hydrochloride is not significantly inhibited up to 100 mg./kg. of the drug, whereas in the heart an 83 percent inhibition can already be observed with 50 mg./kg.

On the other hand, $N^1$-dl-seryl - $N^2$ - (2,3,4-trihydroxybenzyl)-hydrazine hydrochloride, when added to tissues homogenate, causes the same degree of DC inhibition in the brain as in the heart.

Similar results were obtained when, instead of $N^1$-dl-seryl - $N^2$ - (2,3,4 - trihydroxybenzyl)-hydrazine hydrochloride, one of the following substances was used as decarboxylase inhibitor: $N^1$ - l - seryl - $N^2$ -(2,3,4 - trihydroxybenzyl)-hydrazine hydrochloride; $N^1$-glycyl-$N^2$-(2,3,4 - trihydroxybenzyl)-hydrazine hydrochloride; and $N^1$-l-tyrostyl - $N^2$ - (2,3,4 - trihydroxybenzyl)-hydrazine hydrochloride.

Further experiments have shown that practically only the L-antipode (compound C of the table below) of $N^1$-seryl - $N^2$ - (2,3,4 - trihydroxybenzyl)-hydrazine hydrochloride is effective. Thus, the D-seryl derivative, in equimolar doses, is 10–13 times less active than L-seryl compound as inhibitor of the peripheral DC and thus, in increasing the DOPA induced rise of CA in the brain.

As mentioned above, two other compounds have been found to act by the same mechanism as $N^1$-dl-seryl-$N^2$-2,3,4 - trihydroxybenzyl) - hydrazine hydrochloride, viz.:

$N^1$ - glycyl-$N^2$-(2,3,4-trihydroxybenzyl)-hydrazine hydrochloride (compound B of the table below); and
$N^1$ - l - tyrosyl - $N^2$ - (2,3,4-trihydroxybenzyl)-hydrazine hydrochloride (compound D of the table below).

The most active is the glycyl compound, which has been shown to be almost twice as active as the dl-seryl compound and 1½ times as active as the l-seryl compound. Thus, the maximal brain concentration of CA, 1 hour after the application of 3 mg./kg. of DOPA by mouth, is obtained by 10.78–21.56 mg./kg. p.o. of the glycyl compound.

The tryosyl compound has been shown to be as active as the l-seryl compound.

In the following table, the relative potencies of the different compounds are shown as compared to $N^1$-dl-seryl - $N^2$-(2,3,4-trihydroxybenzyl)-hydrazine hydrochloride (compound A).

TABLE

Comparison of the efficacy of various compounds in equimolar doses to 12 mg./kg. of $N^1$-d,l-seryl-$N^2$-(2,3,4-trihydroxybenzyl)-hydrazine hydrochloride (compound A), on the DOPA-induced increase of brain CA.

Compound A _____ 100
Compound B _____ 179
Compound C _____ 136
Compound D _____ 126

Each compound was administered p.o. After 30 minutes, 3 mg./kg. p.o. of 2-14C-DOPA was given by mouth and the animals killed 1 hour later. The effects of the compounds are expressed as arbitrary units, the effect of compound A being taken as standard (100).

In carrying out the invention, an N'-substituted-N²-(2,3,4-trihydroxybenzyl)-hydrazine is administered in combination with L-DOPA. As the hydrazine compound, there can be used N'-dl-seryl-N²-(2,3,4-trihydroxybenzyl)-hydrazine, N'-l-seryl-N²-(2,3,4-trihydroxybenzyl)-hydrazine, N'-glycyl-N²-(2,3,4-trihydroxybenzyl)-hydrazine and N'-tyrosyl-N²-(2,3,4-trihydroxybenzyl) - hydrazine. The hydrazine is preferably employed in the form of a medicinally acceptable acid addition salt of the free base. As used herein the expression "medicinally acceptable acid addition salt" denotes salts of the hydrazine free base with medicinally acceptable acids. Such acids may be inorganic or organic in nature and they include, for example, hydrochloric acid, sulfuric acid, nitric acid, acetic acid, benzoic acid, citric acid, maleic acid, malic acid, etc.

As indicated heretofore, alternate methods are available for carrying out the present invention. For example, the objectives of the invention can be achieved by administering L-DOPA and one of the aforementioned hydrazine compounds separately, the L-DOPA component being administered preferably about 30–60 minutes after the administration of the hydrazine. If desired, however, the invention can be practiced by administering to the patient to be treated a pharmaceutical composition which contains both L-DOPA and the hydrazine compound. Such a composition should preferably be composed in such a manner that the L-DOPA component is released after, suitably about 30–60 minutes after, the hydrazine component. The dosage of the hydrazine compound and the dosage of L-DOPA used in carrying out the invention is critical. Furthermore, a definite quantitative relationship must be maintained between the active ingredients to insure satisfactory results. However, although critical, each of these factors are variable within certain defined limits. Thus, for example, in its most comprehensive embodiment, the invention involves the daily administration of from about 200 mg. to about 1200 mg. of the hydrazine compound, in the form of its hydrochloride, and from about 450 mg. to about 600 mg. of L-DOPA, with the proviso, however, that at all times there will be provided from about 0.5 part by weight to about 3.0 parts by weight, and, preferably, from about 0.5 part by weight to about 2.0 parts by weight, of the hydrazine compound, for each part by weight of L-DOPA used.

In carrying out the invention, the active ingredients can be embodied in separate dosage forms, suitable for oral administration, and administered as such. Suitable oral dosage forms include, for example, soft shell capsules, hard shell capsules, tablets, dragées, etc. In the alternative, the active ingredients, in combination, can be embodied in a dosage form suitable for oral administration. For example, soft shell capsules, hard shell capsules, tablets, dragées, etc. which contain a mixture of L-DOPA and the hydrazine compound can be prepared and used. Preferred are compositions which are composed in such a manner, that the L-DOPA component is released after, suitably about 30–60 minutes after, the hydrazine component. Additionally, the active ingredients can be provided in a form suitable for parenteral administration. In such an instance, it is preferable to administer the active ingredients separately rather than as components of a single parenteral composition. In a preferred embodiment, the invention is carried out by administering a solution of L-DOPA intravenously and a solution of hydrazine, as an acid addition salt, intramuscularly, the L-DOPA solution being preferably applied about 30–60 minutes after the application of the hydrazine solution.

The manner in which the various dosage, i.e., administration forms; which are used in the practice of this invention, are prepared will be readily apparent to persons skilled in the art. Standard techniques and procedures and conventional excipients and adjuvants are utilized in their production. In formulating the dosage forms, the active ingredients, either separately or in combination, can be admixed with inert adjuvants and excipients, either inorganic or organic in nature. Such adjuvants and excipients include, for example, water; gelatin; lactose; dicalciumphosphate; stearic acid; calcium stearate; magnesium stearate; talc; vegetable oils, such as arachis oil; polyalkylene glycols; preservatives; stabilizers; etc. Mixtures of the active ingredient or ingredients with such excipients and adjuvants can be compressed, for example, into tablets, dragées, etc. or they can be filled into suitable capsules. By using appropriate liquid vehicles, solution for parenteral administration can be produced.

The symptoms of depression can be effectively treated by the daily administration of from about 200 mg. to about 1200 mg. of the hydrazine compound in the form of a salt, and from about 450 mg. to about 600 mg. of L-DOPA, with the proviso that, in any instance, there will be provided from about 0.5 part to about 3.0 parts, preferably, from about 0.5 part to about 2.0 parts, by weight, of the hydrazine for each part by weight of L-DOPA used. Ordinarily, the medication will be administered three or four times daily to provide the desired total daily dosage. Thus, for example, the invention can be carried out by administering, three or four times per day, tablets, capsules, etc. containing, separately or in admixture, 150 mg. of the hydrazine compound and 150 mg. of L-DOPA. Dosage forms, or a dosage form, providing, for example, 300 mg. to 400 mg. of the hydrazine compound and 150 mg. of L-DOPA can be administered three times per day. Furthermore, dosage forms, or a dosage form, providing 75 mg. to 100 mg. of the hydrazine compound and from 150 mg. to 200 mg. of L-DOPA can be formulated. In carrying out the invention, one tablet or capsule containing such quantities of the active medicament can be administered three times per day.

The combination therapy described herein is useful in treating depression and potentiating the activity of antidepressants, such as, imipramine, or other such compounds of the type referred to in the publication "New Drugs-Evaluated by A.M.A. Council on Drugs," 1967 edition, as psycho-active drugs having a tricyclic structure.

It is to be understood that the specific dosage forms mentioned heretofore are exemplary only and not intended to limit the scope or practice of the present invention. Within the limits of daily dosage prescribed herein and within the ratio of one active component to the other, set forth heretofore, the amount of the active ingredients administered in any given instance may be varied depending upon the needs and requirements of the patient, as diagnosed by the attending physician.

For a full understanding of the nature and objects of this invention, reference may be had to the following examples which are given merely as further illustrations of the invention and are not to be construed in a limiting sense. In the examples, all parts given are parts by weight unless otherwise indicated.

EXAMPLE 1

(a) Production of L-DOPA administration form

Tablets are produced in a conventional manner, each of said tablets containing:

| | Mg. |
|---|---|
| L-DOPA | 150 |
| Lactose | 200 |
| Corn starch | 135 |
| Magnesium stearate | 1.5 |
| Talcum | 13.5 |

(b) Production of N'-dl-seryl - N² - (2,3,4-trihydroxybenzyl)-hydrazine hydrochloride administration form Tablets are produced in a conventional manner, each of said tablets containing:

| | Mg. |
|---|---|
| N¹-dl-seryl-N²-(2,3,4-trihydroxybenzyl) - hydrazine hydrochloride | 150 |
| Mannitol | 200 |
| Corn starch | 120 |
| Polyvinylpyrrolidone | 15 |
| Magnesium stearate | 1.5 |
| Talcum | 13.5 |

The compositions described in the paragraphs (a) and (b) of this example were used, jointly with 50 mg. of imipramine to treat 20 depressed patients. The combination was administered orally, three times a day. As a result of this treatment, the imipramine action was considerably enhanced and the onset of activity was considerably accelerated as evidenced by the fact that activity commenced on the fourth or fifth day, whereas, when imipramine alone is administered, the activity commences about two weeks after the first administration.

EXAMPLE 2

A hard gelatin capsule, wherein the L–DOPA component is present in a late-release form, is produced as follows:

A core consisting of 50 mg. L–DOPA, 8 mg. corn starch, 15 mg. lactose, 1.8 mg. talcum and 0.2 mg. magnesium stearate is coated with a celluloseacetatephthalate lacquer in order to make it resistant to the gastric juices.

A granulate is prepared which consists of 114.2 mg. of N¹-dl-seryl - N² - (2,3,4-trihydroxybenzyl)-hydrazine hydrochloride, 58.25 mg. mannitol and 23.7 mg. polyvinylpyrrolidone.

The coated core and the granulate are incorporated into a hard gelatin capsule. This composition will release the L–DOPA component about 30–60 minutes after the hydrazine component.

In the paragraphs which follow hereinafter, there is described, in an exemplary manner, the methods of preparing (a), N¹-l-seryl-N²-(2,3,4 - trihydroxybenzyl)-hydrazine; (b) N¹-glycyl-N² - (2,3,4 - trihydroxybenzyl)-hydrazine; and (c) N¹-l-tyrosyl-N²-(2,3,4 - trihydroxybenzyl)-hydrazine. Such descriptions are included herein for the sake of complete disclosure, it being understood that neither the compounds nor the methods for their production are part of the present invention.

(a) 15.4 g. of 2,3,4 - trihydroxy-benzaldehyde are dissolved in 200 ml. of boiling water, whereupon 15.2 g. of l-seryl hydrazine hydrochloride are added to and dissolved in the resulting solution. The solution is then evaporated under reduced pressure and the water is displaced by adding ethanol in small portions. The resulting crystals are separated from the mother liquor by filtration and washed with ethanol and ether. The resulting N¹ - 1 - seryl-N²-(2,3,4-trihydroxybenzylidene)-hydrazine hydrochloride melts at 260–265°. $[\alpha]_D = +23°$ (c.=1 in water).

21 g. of the above benzylidene compound are suspended in 300 ml. of methanol and the resulting suspension is hydrogenated by means of a palladium-on-carbon catalyst. After a hydrogen consumption of 1700 ml., the catalyst is removed by filtration, the filtrate is concentrated under reduced pressure, the resulting viscous residue is dissolved in a small quantity of ethanol and diluted with about 600–700 ml. acetic ester, whereafter an amorphous precipitate is formed. This precipitate is separated from the mother liquor by filtration, washed with acetic ester and ether and dried under reduced pressure over phosphorus pentoxide. The N¹-l-seryl- N² - (2,3,4-trihydroxybenzyl)-hydrazine hydrochloride so obtained is an amorphous substance, which is readily soluble in water and which is decomposed with effervescence at about 120°. $[\alpha]_D = -10°$ (c.=1 in water); $+18°$ (c.=1, in dimethylformamide).

(b) 15.4 g. of 2,3,4 - trihydroxy-benzaldehyde are dissolved in 200 ml. of boiling water, whereupon 15.2 g. of glycyl-hydrazine hydrochloride are added to the resulting solution. After a few minutes the solution becomes turbid and soon solidifies forming a crystalline mass. This mass is cooled in ice-water, filtered and washed with a small quantity of water and a relatively great quantity of acetone. The resulting N¹-glycyl-N² - (2,3,4 - trihydroxybenzylidene)-hydrazine hydrochloride forms white to yellowish crystals melting at 303–305° with decomposition.

24 g. of the N¹-glycyl-N²-(2,3,4 - trihydroxybenzylidene)-hydrazine hydrochloride are suspended in 300 ml. of water and hydrogenated over a palladium-on-carbon catalyst. All of the hydrazide is dissolved when 2.5 liters of hydrogen are consumed. The catalyst is removed by filtration, the filtrate is concentrated to a volume of 40–50 ml. and diluted with 200 ml. of absolute ethanol. Crystallization takes place within a few seconds. The crystalline material is allowed to stand in a refrigerator overnight, filtered, dissolved in 40 ml. of water at a temperature not higher than 40–50° and crystallization is initiated by adding 120 ml. of methanol. The resulting N¹-glycyl-N²-(2,3,4 - trihydroxybenzyl)-hydrazine hydrochloride forms white crystals which dissolve in water forming a solution of neutral reaction, and which melt at 179–182°.

(c) 19.2 g. of l-tyrosyl-hydrazine are dissolved in 300 ml. of methanol and 7 ml. of glacial acetic acid, whereupon 15.4 g. 2,3,4 - trihydroxy-benzaldehyde are added to the resulting solution. The reaction mixture is hydrogenated by means of a palladium-on-carbon catalyst, the calculated quantity of 2.4 liters of hydrogen being consumed in about 1 week. 12.1 ml. of benzyl chloride are then added and hydrogenation is continued until hydrogen consumption is completed. The filtrate obtained upon removal of the catalyst is concentrated under reduced pressure and the reaction product is precipitated by the addition of acetic ester. The N¹-l-tyrosyl-N²-(2,3,4-trihydroxybenzyl)-hydrazine hydrochloride thus obtained is a greenish powder which is readily soluble in water and which decomposes with effervescence at about 120°. $[\alpha]_D = +15°$ (c.=1, in water).

The racemic N¹-tyrosyl-N²-(2,3,4 - trihydroxybenzyl)-hydrazine hydrochloride can be obtained in a manner analogous to that set forth above, using racemic tyrosyl hydrazine as starting material.

What is claimed is:

1. A method of treating depression which comprises administering to a depressed patient an effective dosage of (a) L-3,4 - dihydroxyphenylalanine and (b) a hydrazine compound selected from the group consisting of N'-dl - seryl - N² - (2,3,4-trihydroxybenzyl)-hydrazine, N'-l - seryl - N² - (2,3,4-trihydroxybenzyl)-hydrazine, N'-glycyl - N² - (2,3,4 - trihydroxybenzyl)-hydrazine, N'-tyrosyl-N² - (2,3,4 - trihydroxybenzyl)-hydrazine and a medicinally acceptable acid addition salt of such compounds, the compounds (a) and (b) being used in such quantities as to maintain a ratio of from about 0.5 part to about 3.0 parts by weight of said (b) for each part by weight of said (a).

2. The method of claim 1 wherein the compound (a) is administered about 30–60 minutes after the administration of the compound (b).

3. A method of potentiating the antidepressant activity of tricyclic antidepressants which comprises administering daily to a patient, exhibiting the symptoms of depression, 150 mg. of imipramine in combination with (a) 450 mg. to about 600 mg. of L-3,4 - dihydroxyphenylalanine and (b) 200 mg. to about 1200 mg. of a hydrazine compound selected from the group consisting of N'-dl-seryl-N²-(2,3,4-trihydroxybenzyl)-hydrazine, N'-l-seryl-N²-(2,3,4-trihydroxybenzyl)-hydrazine, N'-glycyl-N² - (2,3,4 - trihydroxybenzyl)-hydrazine, N'-tyrosyl-N²-(2,3,4 - trihydroxybenzyl)-hydrazine and a medicinally acceptable acid addition salt of such compound, the compounds (a) and (b) being used in such quantities as to maintain a ratio of from about 0.5 part to about 3.0 parts by weight of said (b) for each part by weight of said (a).

4. The method of claim 3 wherein the compound (a) is administered about 30–60 minutes after the administration of the compound (b).

References Cited

UNITED STATES PATENTS 3,178,476   4/1965   Hegedüs _____ 424—327

OTHER REFERENCES

Chem. Abst. vol. 65—9600 c (1966).

STANLEY J. FRIEDMAN, Primary Examiner

U.S. Cl. X.R.

424—327